Aug. 9, 1955      C. M. O'LEARY      2,714,804
HYDROKINETIC TORQUE TRANSMITTER AND COOLING SYSTEM THEREFOR
Filed Aug. 3, 1951      2 Sheets-Sheet 1
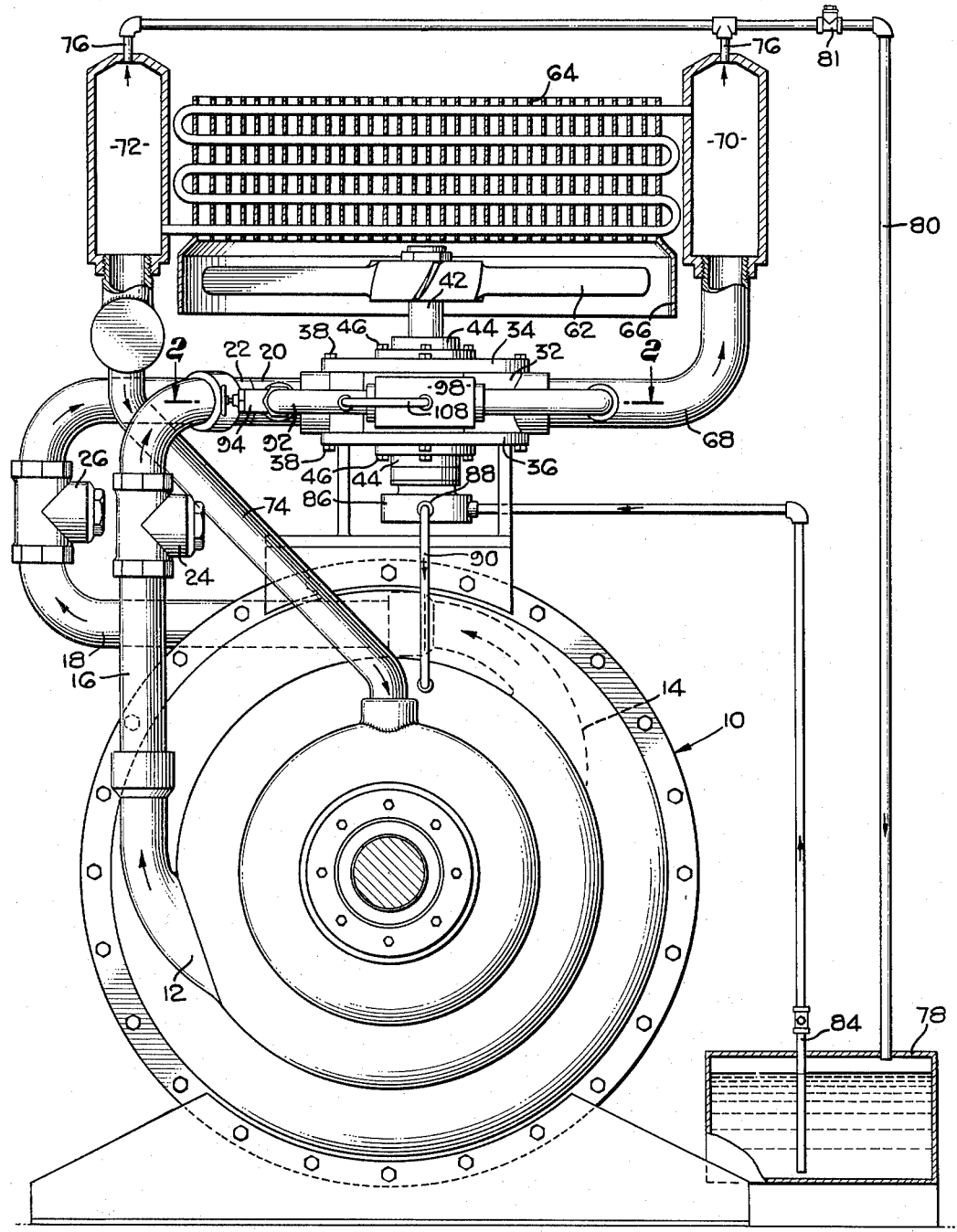
Fig. 1.

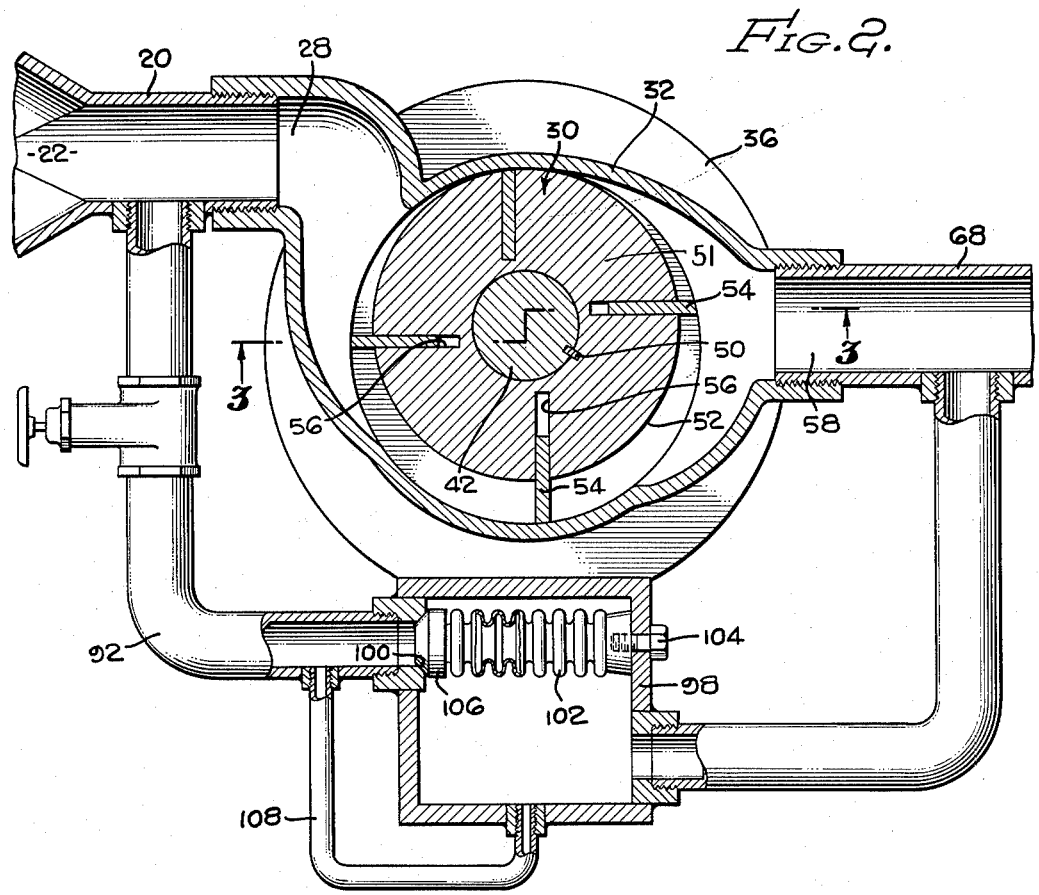
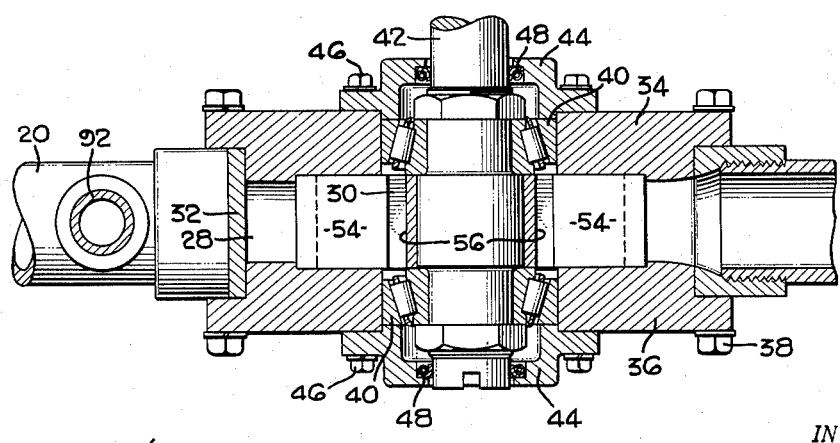

United States Patent Office 2,714,804
Patented Aug. 9, 1955

2,714,804

HYDROKINETIC TORQUE TRANSMITTER AND COOLING SYSTEM THEREFOR

Charles M. O'Leary, Los Angeles, Calif.

Application August 3, 1951, Serial No. 240,178

6 Claims. (Cl. 60—54)

This application is an improvement of my application Serial No. 666,626, filed May 2, 1946, now Patent No. 2,589,120, on Power Transmitting Apparatus, and of my application Serial No. 571,656, filed January 6, 1945, on Oil Well Draw Works, now abandoned.

The present invention relates to hydrokinetic torque transmitters including hydrokinetic torque converters and hydrokinetic torque couplings, and more particularly to hydrokinetic torque converters having a normal fluid outlet from the torus when the turbine is being driven in the same direction as the pump, and a secondary fluid outlet from the torus when the turbine is driven in a direction opposite to that of the pump.

Both hydrokinetic torque converters and hydrokinetic torque couplings operate at different efficiencies for respective different speed ratios of the drive and driven elements. All of the energy lost in the torque transmitter corresponding to the efficiency at which the transmitter is operating is imparted as heat to the operating fluid, and this heat must be dissipated to prevent overheating of the fluid. It is advantageous to dissipate an amount of heat from the fluid which corresponds with that produced in excess of the amount of heat which will maintain the fluid at a temperature which will not be so high as to interfere with the operation of the torque transmitter, so that no more energy is expended in the removal of this heat from the fluid than is necessary.

Accordingly, it is an object of my invention to provide a cooling mechanism for use in hydrokinetic torque converters and couplings which cools the transmitter fluid at a variable rate, according to the amount of heat generated in the fluid above the normal heat.

It is also an object of my invention to provide a cooling mechanism of the character described which is actuated solely by transmission fluid.

Another object of my invention is to provide a cooling mechanism of the character described for use in hydrokinetic torque converters and couplings which is actuated by transmitter fluid propelled by the pump element of the transmitter.

Another object of my invention is to provide a cooling mechanism of the character described for use in hydrokinetic torque converters which cools the transmitter fluid at a variable rate according to the amount of heat generated in the fluid when the turbine element is moving in the same direction as the pump element, is stationary, or is moving in the opposite direction from the pump element.

Another object of my invention is to provide a cooling mechanism for use in hydrokinetic torque converters which will dissipate the excessive heat produced in the transmitter fluid when the converter is being used as a brake rather than as a drive coupling.

A further object of my invention is to provide a cooling mechanism of the character described for use in hydrokinetic torque converters which is actuated by transmitter fluid propelled by the pump element of the transmitter when the converter is operating as a drive connection and which is actuated by transmitter fluid propelled by both the pump and the turbine elements of the transmitter when the converter is operating as a brake.

Other objects and advantages of my invention will become apparent from the following specification and the appended claims.

In the drawings, forming a part of the present specification.

Figure 1 is an elevation view, partly in section, of the preferred embodiment of my invention;

Figure 2 is a sectional view, along the line 2—2 in Figure 1, showing my fan drive impeller and its associated elements; and Figure 3 is a sectional view along the line 3—3 in Figure 2.

Referring to the drawings, the numeral 10 designates a hydrokinetic torque converter having a primary fluid outlet 12 and a secondary fluid outlet 14.

The primary fluid outlet 12 opens into the torus of the converter 10 at a point where fluid is discharged from the outer periphery of the pump element of the converter, where the fluid is at a higher pressure than the fluid at the throat or suction side of the said pump element. The rate of discharge of fluid through the primary fluid outlet 12 corresponds to the rate of speed of the pump element of the converter.

Similarly, a secondary fluid outlet 14 opens into the torus of the converter 10 at a point where fluid is discharged from the outer periphery of the turbine element of the converter when the turbine is being rotated in a direction opposite to that of the pump element and is thereby also operating as a pump. The rate of discharge of fluid through the secondary fluid outlet 14 will depend on the rate of speed of the turbine element of the converter in a direction opposite to that of the pump element.

Fluid lines 16 and 18 are connected to the primary and secondary fluid outlets respectively and are joined to line 20 by means of a Y-joint 22. Check valves 24 and 26 are positioned in fluid lines 16 and 18 respectively so that when the pump and turbine elements of the converter are moving in the same direction, none of the fluid from line 16 will pass back to the converter by line 18, and when the pump and turbine elements of the converter are moving in opposite directions, none of the fluid from the line 18 will pass back to the converter by line 16. Line 20 is connected to the input port 28 of a fluid actuated, fan drive motor 30.

The fluid motor housing includes casing 32, and plates 34 and 36 and bolts 38 which clamp end plates 34 and 36 on opposite sides of casing 32. Bearings 40 are provided in end plates 34 and 36 to support fluid motor shaft 42 which extends outside of the fluid motor housing at both ends. A sealing cap 44 having a central bore therein for fluid motor shaft 42 to pass through is bolted to the outside of each of the end plates 34 and 36 by means of bolts 46, fluid seals 48 being provided in each of the caps 44. Keyed to fluid motor shaft 42 by means of key 50 is rotor 51, the periphery 52 of said rotor 51 being provided with a plurality of rotor vanes 54 slidably mounted in slots 56.

Fluid passes through the input port 28 of the fluid motor housing, between end plates 34 and 36, and out through output port 58. As the fluid thus passes around the rotor 51, it drives the rotor 51. The number of turns which rotor 51 makes per minute will be directly proportional to the quantity of fluid which passes through fluid motor 30 per minute, because rotor 51 acts as a metering device.

Attached to the end of the fluid motor shaft 42 which extends through end plate 34 is a fan 62 which is positioned directly in front of a cooling radiator 64 so as to either draw or blow air through the radiator 64. A suitable shrouding 66 extends outward from the radiator 64 and surrounds fan 62 in order to increase the efficiency of the fan. After the fluid has passed through the fluid motor output port 58, it is conducted through line 68 into radiator input chamber 70 from which it passes through the radiator 64 into radiator output chamber 72. The fluid is then conducted back to the torque converter by means of return conduit 74, the fluid entering the converter at the low pressure intake sides of the pump and turbine elements.

Thus, I provide a closed fluid circuit in which the fluid leaves the output side of the torque converter, passes through a fluid motor to actuate a cooling fan, passes through a cooling radiator which operates in conjunction with said fan to cool the fluid, and then flows back to the low pressure input sides of the converter.

An auxiliary fluid circuit is provided which functions to maintain the fluid pressure in the torus of the converter at a pressure above atmospheric pressure to suppress cavitation of the fluid as it passes over the converter blades.

This auxiliary fluid circuit consists of outlets 76 from radiator chambers 70 and 72, emptying past check valve 81, through line 80, into reservoir 78 and reservoir outlet tube 82 leading through inlet port 84 to pump 86. Reservoir outlet tube 82 is connected to the inlet port 84 of a conventional pressure pump 86 which is bolted to end plate 36. The end of fluid motor shaft 42 which passes through fluid motor end plate 36 is operatively connected to the pressure pump 86 to actuate the pump. Outlet port 88 of pressure pump 86 is connected to the converter by means of line 90. By these means the pressure in the torus is maintained above atmospheric pressure.

In operation the upper portions of radiator chambers 70 and 72 act as traps to collect air that has accumulated in the operating fluid. This air is carried out of radiator chambers 70 and 72 by the operating fluid, which is under pressure, that is bled through outlets 76, check valve 81 and line 80 to reservoir 78, which is vented to atmosphere.

Thus any air in the operating fluid escapes from this fluid while it is in reservoir 78 and only solid fluid is picked up from reservoir 78 through tube 82 by pump 86 to be returned to the torus of the converter through line 90.

In this manner a pressure is maintained in all of the fluid system, excepting only reservoir 78 which is vented to atmosphere.

During the normal operation of the converter, when it is being used as a drive connection so that the pump and turbine elements are turning in the same direction, it is desirable to cool the operating fluid of the converter at a variable rate according to the amount of heat generated in the fluid so that no more energy will be used for cooling purposes than is necessary. In order to do this, I provide a fluid motor by-pass circuit which diverts a portion of the fluid that would normally go through the fluid motor 30 so as to reduce the speed of the fan 62. This by-pass circuit contains two controlling devices, one of which permits an operator to manually adjust the temperature of the fluid, and the other of which automatically maintains the temperature substantially constant, regardless of the amount of heat which is generated in the fluid due to different operating conditions of the converter.

This by-pass circuits consists primarily of a by-pass line 92 which connects fluid line 20 from the Y-joint 22 to line 68 from the fluid output port 58 of fluid motor 30. Although by-pass line 92 in my preferred embodiment by-passes fluid motor 30 only, it is to be understood that my invention can be constructed so that line 92 by-passes the radiator only, or both the fluid motor and the radiator.

A manually operable metering valve 94 is positioned in by-pass line 92 and, by this means alone, the speed of fan 62, and hence the temperature of the operating fluid, can be manually adjusted. My preferred embodiment is to also provide in by-pass line 92 a thermostatic valve which permits more fluid to by-pass the fluid motor when the fluid becomes cooler than the normal operating temperature so that the fan speed will be reduced, causing less heat to be removed from the fluid, and which permits less fluid to by-pass the fluid motor when the fluid becomes warmer than the normal operating temperature so that the fan speed will be increased, causing more heat to be removed from the fluid.

My thermostatic by-pass valve may be of any conventional thermostatic valve construction, but the presently preferred valve construction is illustrated in Figure 2. A valve housing 98 is imposed in the by-pass line 92, the connection between line 92 and housing 98 being bevelled on the inside of housing 98 to form a valve seat 100. A thermally expandable valve element 102 is integrally attached to the inner wall of housing 98 directly opposite the valve seat 100 by means of a bolt 104, and is provided with a valve 106 which is adapted to control the rate of by-pass of fluid and thus control the fan speed responsive to temperature changes in the converter by seating and unseating valve 106 in accordance with temperature rises and drops respectively. A small auxiliary by-pass line 108 by-passes the valve seat by connecting the by-pass line 92 leading into the thermostatic valve housing 98 with the inside of the thermostatic valve housing 98. This auxiliary by-pass line 108 keeps a small amount of fluid flowing into the thermostatic valve housing 98 at all times so that when the thermostatic valve is closed, and there is a subsequent temperature drop in the fluid, the thermostatic valve will respond to this drop.

Although the outputs of both the primary fluid outlet 12 and the secondary fluid outlet 14 are controlled by the by-pass line and the valves therein in the preferred embodiment of my invention, it is to be understood that the by-pass line and its associated elements can be connected to only the primary fluid outlet 12. It is further understood that the by-pass line could be eliminated and a thermally opening thermostatic valve could be placed in the main line of fluid flow in substitution therefor, this valve being either placed in the line 16 which carries fluid from outlet 12, or in the line 20 which carries fluid from both outlet 12 and outlet 14.

When the torque converter is used as a brake, so that the pump and turbine elements are moving in opposite directions, the heat imparted to the operating fluid in the converter is considerably greater than when the torque converter is being used as a drive connection. Part of this increase in the heat losses is due to the fact that the turbine element of the converter is an inefficient pump. At this time, the heat losses in the converter are the sum of the horsepower of the engine plus the horsepower developed by the load on the turbine attempting to rotate it in a direction opposite to the direction of the pump.

Thus, when the converter is being used as a brake, it is necessary to remove this greater amount of heat from the operating fluid. This is accomplished by the provision of the secondary fluid outlet 14 to receive the fluid now being pumped by the turbine element of the converter and transmit it through fluid line 18 to the fluid motor 30. Because of the inefficiency of the turbine element as a pump, for corresponding heat losses of the pump and turbine elements of the converter, the turbine element will pump less fluid out of outlet 14 than the pump element will pump out of outlet 12. To compensate for this deficiency of the turbine element, the secondary fluid outlet 14 is made larger than the primary fluid outlet 12.

Thus, when the converter is acting as a brake, the fan will be driven at a greater rate of speed than it was when the converter was being used as a drive connection, and the necessary greater cooling effect will take place. During this braking operation, the fluid motor is being driven by the combined fluids from both of the converter elements in amounts according to the respective speeds of the two converter elements. If at any time during the braking operation the temperature of the fluid exceeds the normal operating temperature, the thermostatic by-pass valve 106 will close, so that substantially all of the fluid from both elements of the turbine passes through the fluid motor. However, if the temperature is not in excess of the operating temperature, the thermostatic by-pass valve will be open, so that although all of the fluid from the turbine element will not pass through the fluid motor, and only a part of the fluid from the pump element assists in driving the fluid motor.

Sometimes when the turbine has been brought to rest after a braking operation the fluid will be in excess of the normal operating temperature. The thermostatic valve 106 will then be closed, and will remain closed as the normal driving operation proceeds, until the temperature has again reached the normal operating temperature.

When my invention is used in connection with a hydrokinetic torque coupling instead of a torque converter, it can be constructed the same, or a scoop or any other suitable outlet means can be used to draw off the fluid.

My invention constitutes an important advance in the art, for the reasons that it is simple to manufacture, including only a few simple parts, is easy to operate, being operable chiefly automatically, and is efficient in cooling the torque transmitter fluid for all operating conditions of the transmitter.

Although the presently preferred embodiment of my invention has been herein illustrated and described, it will be apparent that others may be produced which are within the spirit of my invention and the scope of the appended claims.

I claim:

1. A torque transmitting device including a hydrokinetic torque converter having pump and turbine elements and containing operating fluid, a fluid outlet on said converter connected to a point in said converter where said operating fluid is discharged from said pump element at a relatively high pressure, a fluid circuit extending fom said fluid outlet to a relatively low pressure region of said torque converter and an operating fluid cooling device including a fan drive motor operated by the flow of said operating fluid in said fluid circuit.

2. A torque transmitting device including a hydrokinetic torque converter having pump and turbine elements and containing operating fluid, a fluid outlet from said torque converter connected to a point in said torque converter where said operating fluid is discharged from said pump element, a fluid circuit extending from said fluid outlet to a low pressure region of said converter and an operating fluid cooling device including a fan drive motor operated by the flow of said operating fluid in said fluid circuit, said cooling device including a thermostatic valve for controlling the rate of cooling of said operating fluid in accordance with the temperature of said fluid.

3. A torque transmitting device including a hydrokinetic torque converter having pump and turbine elements and containing operating fluid, a fluid outlet on said converter connected to a point in said converter where said operating fluid is discharged from said pump element, a fluid circuit extending from said fluid outlet to a low pressure region of said torque converter, an operating fluid cooling device including a fan drive motor operated by the flow of said operating fluid in said fluid circuit, an operating fluid by-pass line by-pasing a portion of said operating fluid in said fluid circuit around said motor and a thermostatic valve in said line for controlling the rate of cooling of said operating fluid in accordance with the temperature of said fluid by controlling the rate of flow of said fluid in said by-pass line.

4. A torque transmitting device including a hydrokinetic torque converter having pump and turbine elements and containing operating fluid, a fluid outlet on said converter connected to a point in said converter where said operating fluid is discharged from said pump element, a second fluid outlet on said converter connected to a point in said converter where said operating fluid is discharged from said turbine element when said elements are moving in opposite directions, a fluid circuit extending from said fluid outlets to a low pressure region of said converter and an operating fluid cooling device including a fan drive motor operated by the flow of said operating fluid in said fluid circuit.

5. A torque transmitting device including a hydrokinetic torque converter having pump and turbine elements and containing operating fluid, a fluid outlet on said converter connected to a point in said converter where said operating fluid is discharged from said pump element, a second fluid outlet on said converter connected to a point in said converter where said operating fluid is discharged from said turbine element when said elements are moving in opposite directions, a fluid circuit extending from said fluid outlets to a low pressure region of said converter, an operating fluid cooling device including a fan drive motor operated by the flow of said operating fluid in said fluid circuit, an operating fluid by-pass line by-passing a portion of said operating fluid in said fluid circuit around said motor and a thermostatic valve in said by-pass line for controlling the rate of cooling of said operating fluid in accordance with the temperature of said fluid by controlling the rate of flow of said fluid in said by-pass line.

6. A torque transmitting device including a hydrokinetic torque converter having pump and turbine elements and containing operating fluid, a fluid outlet on said converter connected to a point in said converter where said operating fluid is discharged from said pump element, a second fluid outlet on said converter connected to a point in said converter where said operating fluid is discharged from said turbine element when said elements are moving in opposite directions, a fluid circuit extending from said fluid outlets to a low pressure region of said converter, an operating fluid cooling device including a fan drive motor operated by the flow of said operating fluid in said fluid circuit, an operating fluid by-pass line by-passing a portion of said operating fluid from said first named fluid outlet on said converter around said motor and a thermostatic valve in said by-pass line for controlling the rate of cooling of said operating fluid in accordance with the temperature in said by-pass line.

References Cited in the file of this patent

UNITED STATES PATENTS

| | | |
|---|---|---|
| 1,256,709 | Ludeman | Feb. 19, 1918 |
| 1,915,547 | North et al. | June 27, 1933 |
| 2,144,030 | Potter | Jan. 17, 1939 |
| 2,185,498 | Carson et al. | Jan. 2, 1940 |
| 2,289,440 | Kugel | July 14, 1942 |
| 2,392,300 | Ziebolz et al. | Jan. 1, 1946 |
| 2,459,734 | McCracken | Jan. 18, 1949 |
| 2,487,842 | Whiteman et al. | Nov. 15, 1949 |
| 2,558,976 | O'Leary | July 3, 1951 |
| 2,578,876 | Banner | Dec. 18, 1951 |
| 2,638,746 | Kelley | May 19, 1953 |
| 2,643,517 | Michell | June 30, 1953 |